(12) United States Patent
Gill et al.

(10) Patent No.: US 11,988,290 B2
(45) Date of Patent: May 21, 2024

(54) COOLANT FLOW CONTROL VALVE

(71) Applicant: Vitesco Technologies USA, LLC, Auburn Hills, MI (US)

(72) Inventors: Ravinder Singh Gill, Chatham (CA); Alexander Dragojlov, Chatham (CA); Benjamin MacNally, Chatham (CA); Jeremy Daniel Schmidt, Chatham (CA)

(*) Notice: Subject to any disclaimer, the term of this patent is extended or adjusted under 35 U.S.C. 154(b) by 123 days.

(21) Appl. No.: 17/644,440

(22) Filed: Dec. 15, 2021

(65) Prior Publication Data
US 2023/0139552 A1 May 4, 2023

Related U.S. Application Data

(60) Provisional application No. 63/263,422, filed on Nov. 2, 2021.

(51) Int. Cl.
*F16K 11/085* (2006.01)
*F16K 11/16* (2006.01)
*F01P 7/14* (2006.01)

(52) U.S. Cl.
CPC ........ *F16K 11/165* (2013.01); *F16K 11/0856* (2013.01); *F01P 2007/146* (2013.01)

(58) Field of Classification Search
CPC ................................................. F16K 11/0856
See application file for complete search history.

(56) References Cited

U.S. PATENT DOCUMENTS

| | | | |
|---|---|---|---|
| 668,833 A | 2/1901 | Gilbert | |
| 3,499,467 A | 3/1970 | Mccord | |
| 3,630,231 A | 12/1971 | Miller | |
| 3,692,041 A * | 9/1972 | Bondi | F02C 7/22 |
| | | | 416/157 R |
| 3,927,693 A | 12/1975 | Johnston | |
| 4,108,207 A | 8/1978 | Doody | |
| 5,967,185 A | 10/1999 | Baruschke et al. | |
| 6,295,828 B1 | 10/2001 | Koo | |
| 6,539,899 B1 | 4/2003 | Piccirilli et al. | |
| 8,740,186 B2 | 6/2014 | Lauridsen | |

(Continued)

FOREIGN PATENT DOCUMENTS

| | | |
|---|---|---|
| CN | 2093285 U | 1/1992 |
| CN | 2198478 Y | 5/1995 |

(Continued)

*Primary Examiner* — Michael R Reid (57) ABSTRACT

A multi-level rotor for a coolant flow control valve assembly, which accommodates an increased number of inlet ports, outlet ports, and flow channels using a single rotor located in a housing, enabling a larger number of flow configurations. The housing includes nine ports which may function as an inlet or an outlet, which facilitates different flow configurations. For a thermal management system, reduced cost and less space utilization is achieved by a reduced number of valves, where the multi-level rotor is able to fluidically connect multiple inlets/outlets. This enables different flow configurations, depending on the degree of rotation. The channels at different levels are sealed from each other within the housing. The flow channels are manufactured into a single entity, therefore always having the same positional accuracy relative to each other when the rotor is repositioned.

15 Claims, 9 Drawing Sheets

(56) References Cited

U.S. PATENT DOCUMENTS

| | | | |
|---|---|---|---|
| 9,212,751 | B2 | 12/2015 | McLane et al. |
| 9,381,921 | B2 | 7/2016 | Roudeau et al. |
| 9,382,833 | B2 | 7/2016 | Morein |
| 9,383,032 | B1 | 7/2016 | Bhatasana |
| 9,404,594 | B2 | 8/2016 | Morein |
| 9,500,299 | B2 | 11/2016 | Morein et al. |
| 9,958,082 | B2 | 5/2018 | Yu et al. |
| 10,344,877 | B2 | 7/2019 | Roche et al. |
| 10,458,562 | B2 | 10/2019 | Ozeki et al. |
| 10,544,725 | B2 | 1/2020 | Schaefer |
| 10,690,040 | B2 | 6/2020 | Jang et al. |
| 10,704,453 | B2 | 7/2020 | Park et al. |
| 10,808,856 | B2 | 10/2020 | Shen et al. |
| 10,927,972 | B2 | 2/2021 | Murakami |
| 10,968,809 | B2 | 4/2021 | Yoshimura et al. |
| 10,968,810 | B2 | 4/2021 | Zhou et al. |
| 11,703,135 | B2 * | 7/2023 | Gill .................... F16K 11/0856 137/625.47 |
| 2003/0098077 | A1* | 5/2003 | McLane .............. F16K 11/0856 137/625.47 |
| 2006/0237359 | A1 | 10/2006 | Lin et al. |
| 2010/0319796 | A1 | 12/2010 | Whitaker |
| 2015/0354716 | A1 | 12/2015 | Morein |
| 2017/0152957 | A1 | 6/2017 | Roche et al. |
| 2018/0080664 | A1 | 3/2018 | Arrus |
| 2018/0094735 | A1 | 4/2018 | Clement |
| 2018/0292016 | A1 | 10/2018 | Ledvora et al. |
| 2019/0136724 | A1 | 5/2019 | Wong |

FOREIGN PATENT DOCUMENTS

| | | |
|---|---|---|
| CN | 201502748 U | 6/2010 |
| CN | 201944338 U | 8/2011 |
| CN | 204729668 U | 10/2015 |
| CN | 105408671 A | 3/2016 |
| CN | 205401824 U | 7/2016 |
| CN | 107690543 A1 | 2/2018 |
| CN | 108692066 A | 10/2018 |
| DE | 19707534 A1 | 5/1998 |
| EP | 0048680 A1 | 3/1982 |
| EP | 290514 A1 | 11/1988 |
| EP | 1448877 A1 | 8/2004 |
| EP | 3385583 A1 | 10/2018 |
| FR | 2988459 A1 | 9/2013 |
| JP | H246039 A1 | 2/1990 |
| JP | H828725 A1 | 2/1996 |
| WO | 2003046342 A1 | 6/2003 |
| WO | 20142014052571 | 4/2014 |
| WO | 2015004497 A1 | 1/2015 |

* cited by examiner

COOLANT FLOW CONTROL VALVE

CROSS-REFERENCE TO RELATED APPLICATIONS

This application claims the benefit of provisional application 63/263,422, filed Nov. 2, 2021. The disclosure of the above application is incorporated herein by reference.

FIELD OF THE INVENTION

The invention relates generally to a multi-port coolant flow control valve assembly which includes a rotor having various channels which are used to configure the multi-port valve assembly to have various flow paths between multiple ports.

BACKGROUND OF THE INVENTION

Multi-port valves for directing fluid through various conduits are generally known. Some of the more common types of valve are a three-port valve and a four-port valve, where a single valve member is used to direct fluid from an inlet port to one of several outlet ports. Some multi-port valves include a five-port configuration, where multiple actuators are used to change the configuration of the valve to direct the flow of fluid as desired. There are also manifold style valves up to eight ports are available but offer very little flexibility to accommodate different flow modes and different flow paths.

These current designs have a limited amount of ports and flow channels, and may include the use of a proportioning valve, where the maximum number of three flow configurations is achieved using a five-port valve. For a non-proportioning valve, maximum number of inlets/outlets is eight. Current thermal management systems require the use of multiple valves to provide thermal management to desired components. Using multiple valves also requires multiple actuators driven separately by a control unit, and each of the actuators and valves may have different mounting requirements. This results in increased cost due to multiples of the same components used for each valve (i.e., holding bracket, actuator, electrical harness, etc.). Extra connections for fluid flow between different valves are also required, which also influences cost, and can be complex to manufacture. Some of these existing designs offer little to no flexibility to accommodate multiple flow modes and multiple flow paths.

Accordingly, there exists a need for a multi-port valve assembly which is able to direct flow from an inlet port to multiple outlet ports, which enables a simpler thermal management system and is less costly to manufacture.

SUMMARY OF THE INVENTION

In an embodiment, the present invention is a coolant flow control valve (CFCV) which includes an actuator which is used to rotate a rotor to one or more positions, and thus direct coolant (passing through the rotor) between ports. The rotor is rotated to different positions to create various flow paths, such that coolant is directed between the different openings linking various components of a thermal management system.

In an embodiment, the present invention is a multi-level rotor which accommodates an increased number of inlet ports, outlet ports, and flow channels using a single rotor located in a housing, enabling a larger number of flow configurations.

In an embodiment, the housing includes nine ports which may function as an inlet or an outlet, which achieve different flow configurations.

For a thermal management system, reduced cost and less space utilization is achieved by a reduced number of valves in a system, where a single rotor is able to fluidically connect nine inlets/outlets, and a reduced number of supporting components (i.e., holding brackets, hoses, harnesses etc.).

In an embodiment, the present invention includes a multi-level flow routing rotor which enables different flow configurations at each level, depending on the degree of rotation. The channels at different levels are sealed from each other within the housing allowing multiple flow configurations. The flow channels are manufactured into a single entity and thus always have same positional accuracy relative to each other when the rotor is moving. At different rotational angles of the rotor, flow channels at each level flow into/out of different mating ports.

In an embodiment, the present invention is a coolant flow control valve assembly, which includes a housing, a plurality of ports, each of the plurality of ports formed as part of the housing, a rotor disposed in the housing, and a plurality of channels integrally formed as part of the rotor, each of the channels selectively in fluid communication with one or more of the ports. The coolant flow control valve assembly also includes a first plane extending through the rotor, a second plane extending through the rotor, a first level on one side of the first plane, where a portion of the channels is integrally formed as a part of the rotor which is located on the first level, a second level on the opposite side of the first plane in relation to the first level, and located between the first plane and the second plane, where a portion of the channels is integrally formed as a part of the rotor which is located on the second level, and a third level located on the opposite side of the second plane in relation to the second level, where a portion of the channels is integrally formed as part of the rotor which is located on the third level. In an embodiment, the coolant flow control valve assembly also includes a plurality of flow paths formed by the orientation of the rotor relative to the housing and the ports, where the rotor is placed in one of a plurality of configurations to achieve the flow paths.

In an embodiment, the channels includes at least one recess channel integrally formed as part of the rotor, where the recess channel is located on the third level, at least one through-channel integrally formed as part of the rotor, where the through-channel is located on the second level, at least one side channel integrally formed as part of the rotor, and a central channel integrally formed as part of the rotor, where the central channel is in fluid communication with the side channel. In an embodiment, the rotor is rotated relative to the housing such that one of the flow paths includes one of the recess channel, the through-channel, or the side channel.

In an embodiment, the recess channel is fluidically isolated from the second recess channel, the through-channel, and the side channel. In an embodiment, the through-channel is fluidically isolated from the side channel.

In an embodiment, the at least one side channel includes a shallow recess portion, and an elongated channel integrally formed with and in fluid communication with the shallow recess portion. The elongated channel is in fluid communication with the central channel. In an embodiment, the shallow recess portion is located on the second level, and the elongated channel is located on the first level.

In an embodiment, the shallow recess portion further comprising at least one bulge portion, and the rotor is rotated an angular distance between two or more of a plurality of configurations, such that the side channel maintains fluid communication with one of the ports as the rotor is rotated between two or more of the configurations.

In an embodiment, the central channel is located on the first level.

In an embodiment, the recess channel includes a first recess channel integrally formed as part of the rotor, where the first recess channel is located on the third level, and a second recess channel integrally formed as part of the rotor, where the second recess channel is located on the third level. In an embodiment, the rotor is rotated relative to the housing such that one of the flow paths includes one of the first recess channel, the second recess channel, or the side channel.

In an embodiment, at least one of the flow paths facilitates flow between the first level and the second level.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

A first embodiment of a coolant flow control valve assembly according to the present invention in shown in FIGS. 1A-6C generally at 10. Referring to FIGS. 1A-1H, the valve assembly 10 includes a housing 12, and inside the housing 12 is a cavity, shown generally at 14. Located in the cavity 14 is a valve member, which in this embodiment is a rotor, shown generally at 16. The rotor 16 is generally cylindrical in shape. The rotor 16 is able to rotate about an axis 18. In an embodiment, the rotor 16 is connected to a gear train, which is driven by an electric motor to rotate the rotor in the housing 12, but it is within the scope of the invention that the rotor 16 may be rotated using other devices.

The housing 12 includes several ports 20a, 20b, 20c, 20d, 20e, 20f, 20g, 20h, 20i. The ports 20a, 20b, 20c, 20d, 20e, 20f, 20g, 20h, 20i are in selective fluid communication with various channels integrally formed as part of the rotor 16. The rotor 16 has channels which distribute fluid between two levels, a first level, shown generally at 22, a second level, shown generally at 24, and a third level, shown generally at 26. The first level 22 and the second level 24 are separate by a first plane 28, where the first level 22 is on one side of the first plane 28, and the second level 24 is on the opposite side of the first plane 28 as the first level 22. The second level 24 and the third level 26 are separated by a second plane 30, where the second level 24 is on the opposite side of the second plane 30 as the third level 26.

One of the ports 20e is on one side of the first plane 28 on the first level 22, and another portion of the ports 20a, 20b, 20c, 20d is located on the opposite side of the first plane 28 on the second level 24. The portion of the ports 20a, 20b, 20c, 20d located on the second level 24 are also on one side of the second plane 30, and another portion of the ports 20f, 20g, 20h, 20i are on the opposite side of the second plane 30 on the third level 26.

Integrally formed as part of the rotor 16 is a first side channel, shown generally at 32, a second side channel, shown generally at 34, and a third side channel, shown generally at 36. The first side channel 32 includes a first shallow recess portion 32a and a first elongated channel 32b, which are in fluid communication with each other. The first elongated channel 32b is in fluid communication with a central channel 38. The first shallow recess portion 32a is located on the second level 24 and the first elongated channel 32b is located on the first level 22, such that when the rotor 16 is placed in one of a plurality of configurations, the fluid is able to flow between the first level 22 and the second level 24.

The second side channel 34 includes a second shallow recess portion 34a and a second elongated channel 34b, which are in fluid communication with each other. The second elongated channel 34b is in fluid communication with the central channel 38. The second shallow recess portion 34a is located on the second level 24, and the second elongated channel 34b is located on the first level 22, such that when the rotor 16 is placed in one of a plurality of configurations, the fluid is able to flow between the first level 22 and the second level 24.

The third side channel 36 includes a third shallow recess portion 36a and a third elongated channel 36b, which are in fluid communication with each other. The third elongated channel 36b is in fluid communication with the central channel 38. The third shallow recess portion 36a is located on the second level 24, and the third elongated channel 36b is located on the first level 22, such that when the rotor 16 is placed in one of a plurality of configurations, the fluid is able to flow between the first level 22 and the second level 24. Because the first side channel 32, the second side channel 34, and the third side channel 36 are all in fluid communication with the central channel 38, the first side channel 32, the second side channel 34, and the third side channel 36 are all in fluid communication with each other. Furthermore, the central channel 38 is in fluid communication with the fifth port 20e. The third shallow recess portion 36a also incudes a bulge portion 36c, such that the third shallow recess portion 36a is also wider than the first shallow recess portion 32a and the second shallow recess portion 34a.

Also integrally formed as part of the rotor 16 is a through-channel, shown generally at 40, which is located on the second level 24. The through channel 40 includes an elongated through-channel portion, shown generally at 40a, and a wide portion, shown generally at 40b, which are in fluid communication with one another. The elongated through-channel portion 40a extends through the rotor 16 such that the elongated through-channel portion 40a intersects with the axis 18.

Also formed as part of the rotor 16 is a first recess channel, shown generally at 42, and a second recess channel, shown generally at 44, where both of the recess channels 42, 44 are located on the third level 26. The first recess channel 42 includes a first side wall 42a, an outer wall 42b, and an inner wall 42c. The second recess channel 44 includes a second side wall 44a, an outer wall 44b, and an inner wall 44c.

The through channel 40 is fluidically isolated from the first side channel 32, the second side channel 34, and the third side channel 36, and the through channel 40 is also fluidically isolated from the first recess channel 42 and the second recess channel 44. The first recess channel 42 and the second recess channel 44 are also fluidically isolated from the first side channel 32, the second side channel 34, and the third side channel 36.

Figure 1A:
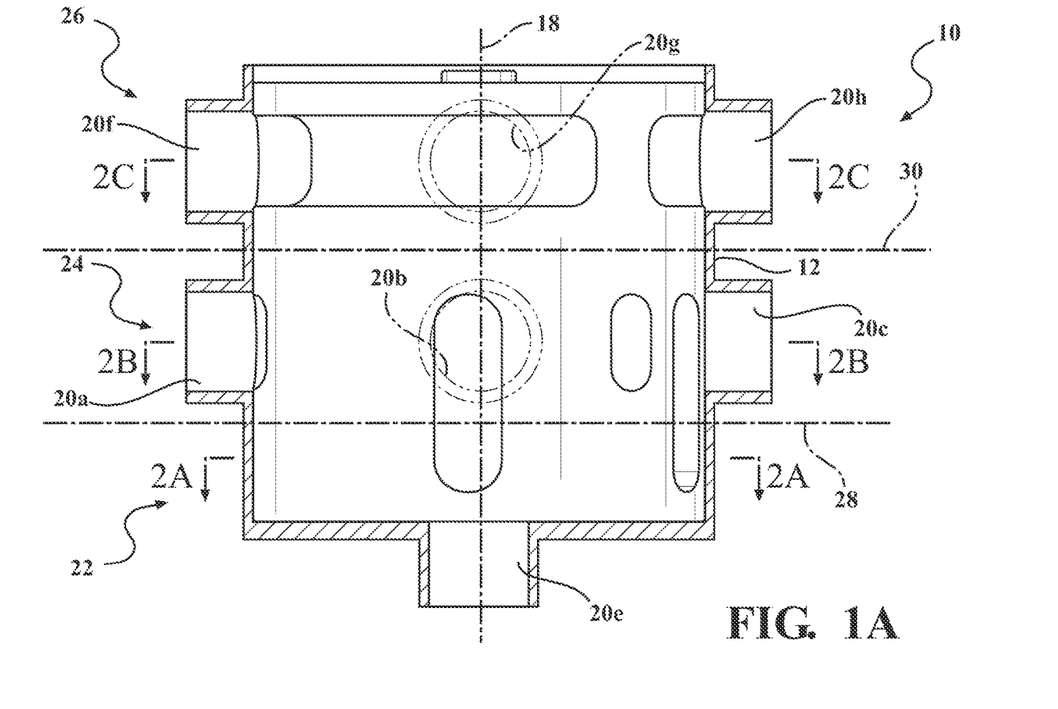
FIG. 1A is side view of a coolant flow control valve, according to embodiments of the present invention.
Figure 1B:
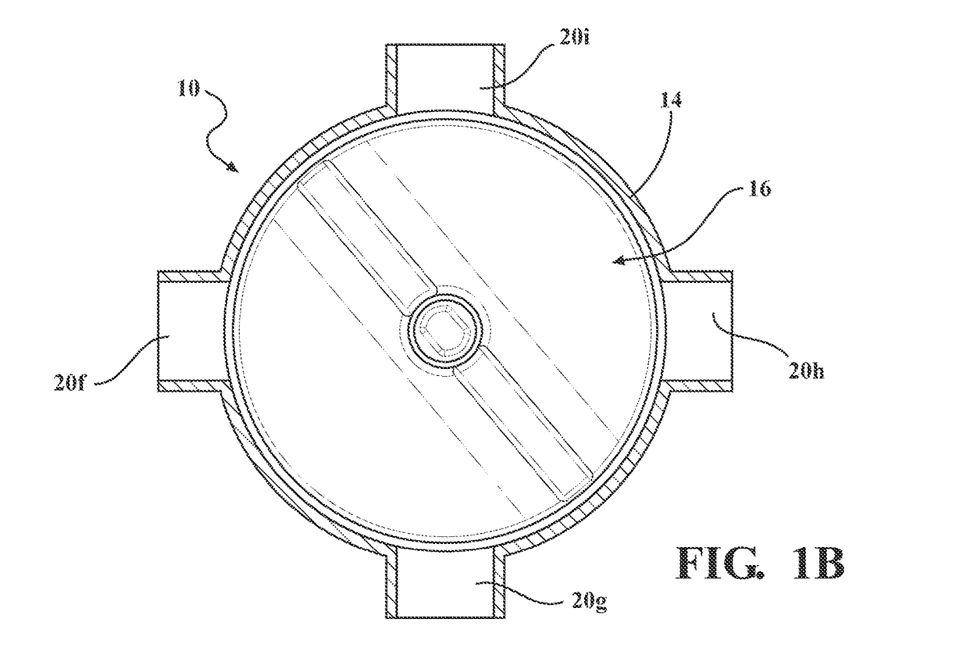
FIG. 1B is a sectional view taken along line 1B-1B of FIG. 1A.
Figure 1C:
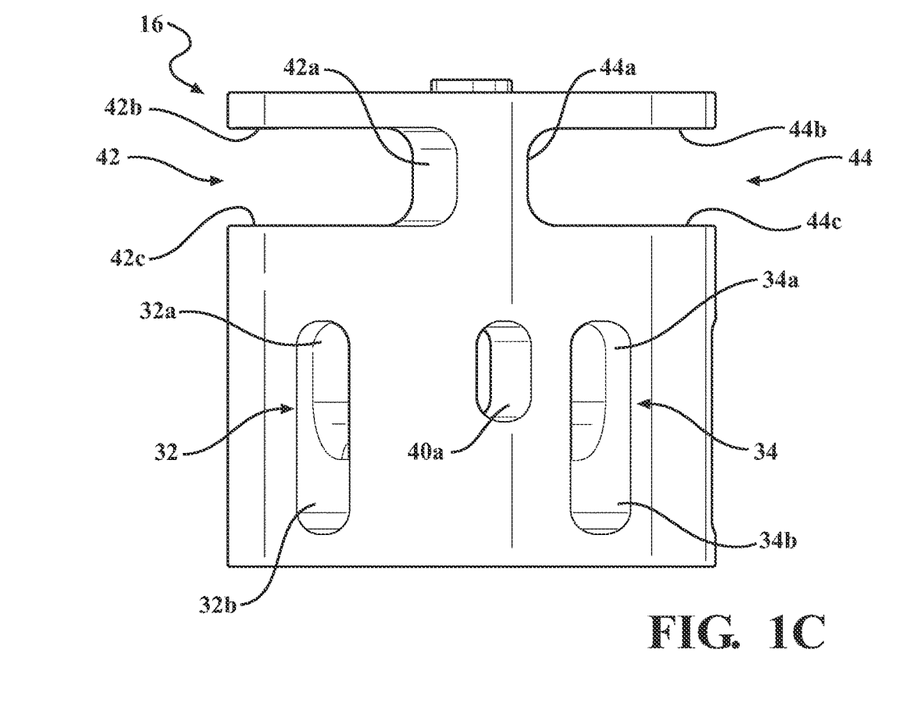
FIG. 1C is first side view of a rotor used as part of a first embodiment of a coolant flow control valve assembly, according to embodiments of the present invention.
Figure 1D:
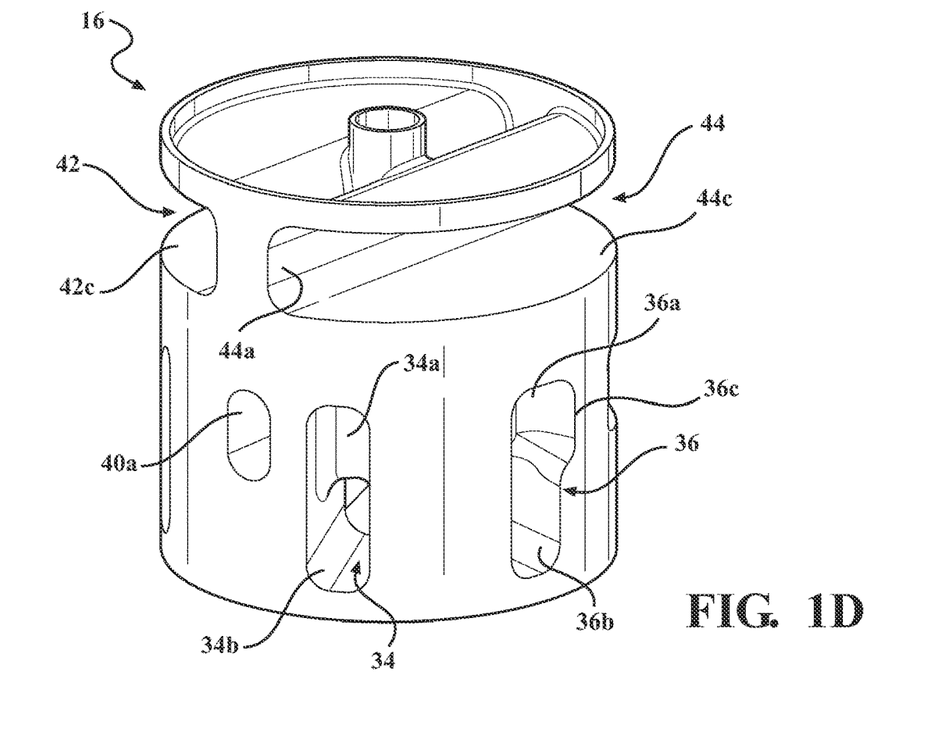
FIG. 1D is a perspective view of a rotor used as part of a first embodiment of a coolant flow control valve assembly, according to embodiments of the present invention.
Figure 1E:
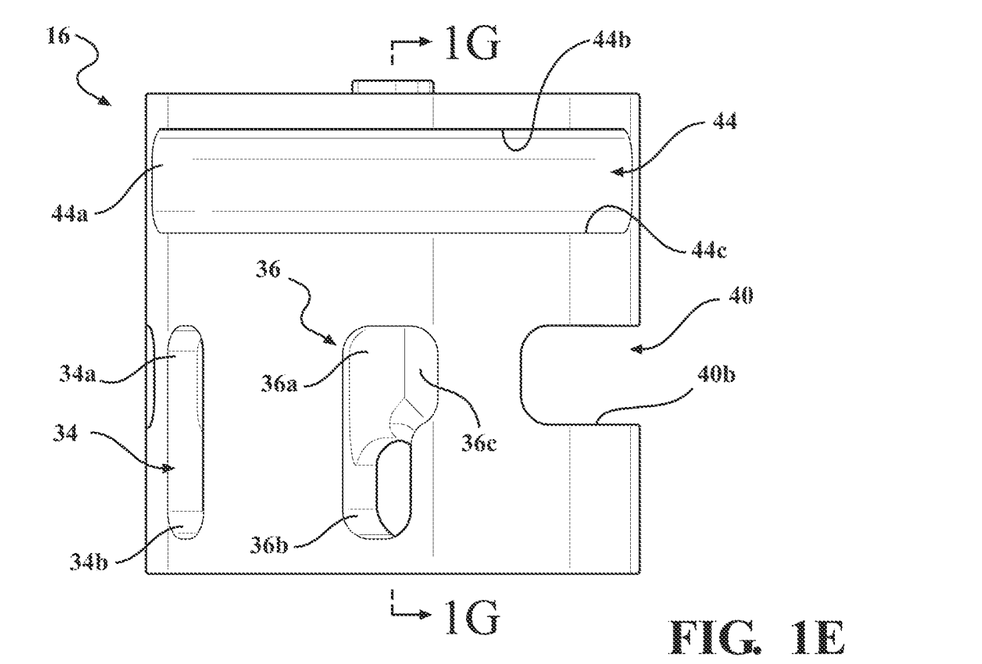
FIG. 1E is a second side view of a rotor used as part of a first embodiment of a coolant flow control valve assembly, according to embodiments of the present invention.
Figure 1F:
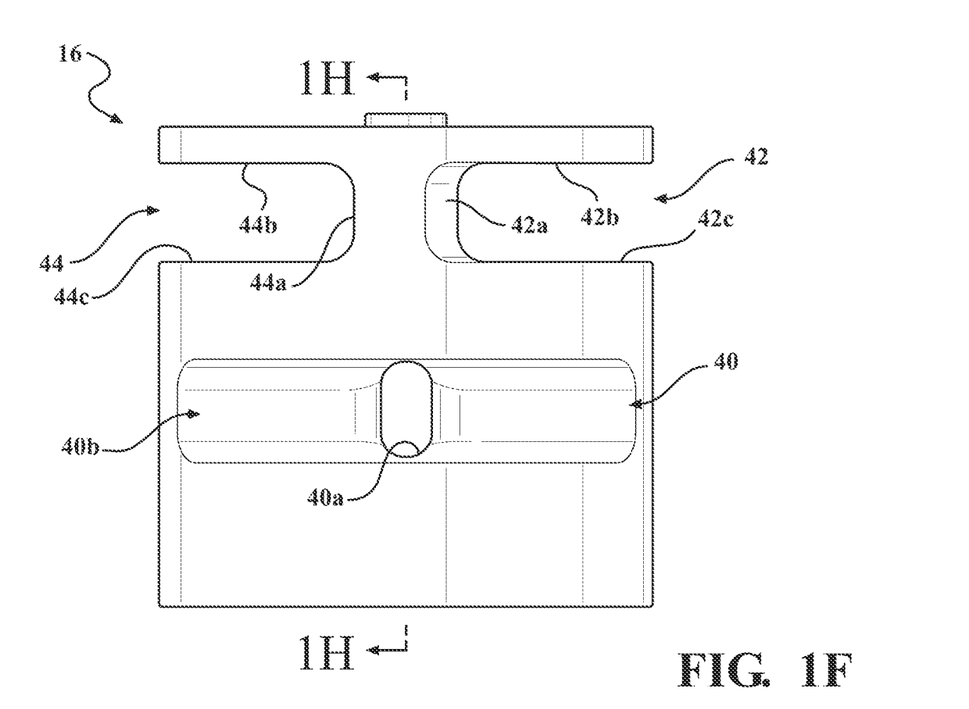
FIG. 1F is a third side view of a first embodiment of a coolant flow control valve assembly, according to embodiments of the present invention.
Figure 1G:
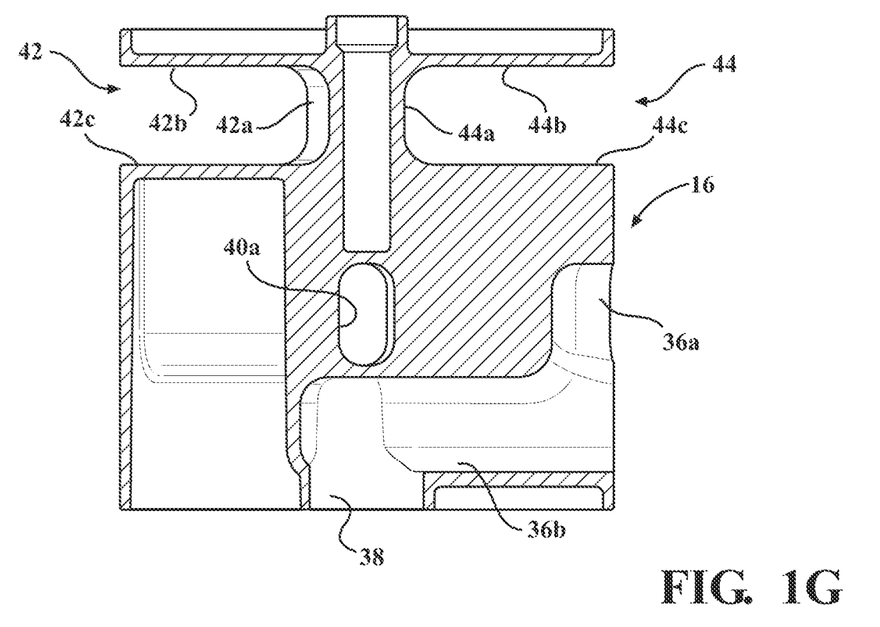
FIG. 1G is a sectional view taken along lines 1G-1G of FIG. 1E.
Figure 1H:
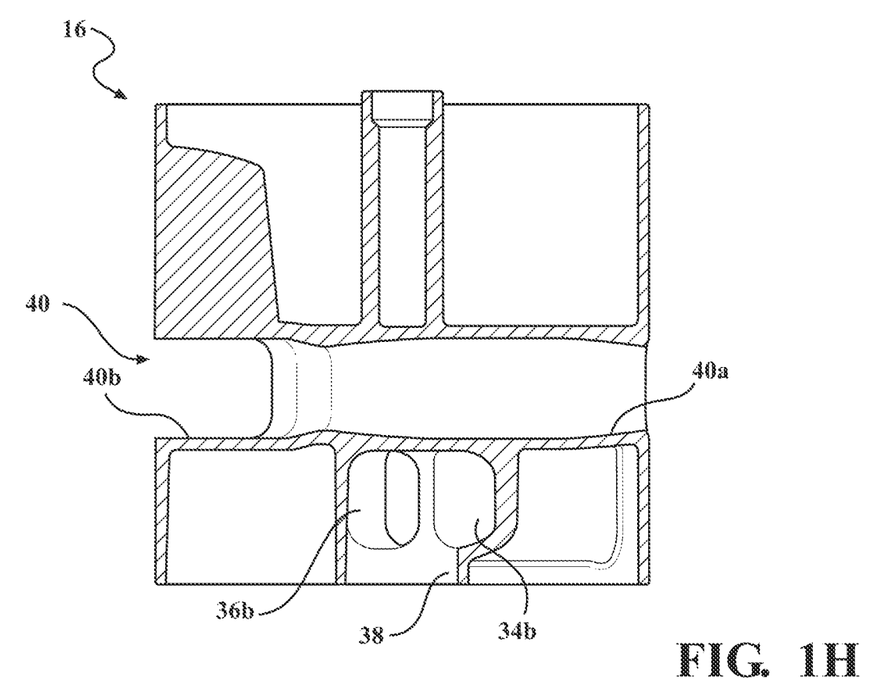
FIG. 1H is a sectional view taken along lines 1H-1H of FIG. 1F.
Figures 2A, 2B, 2C:
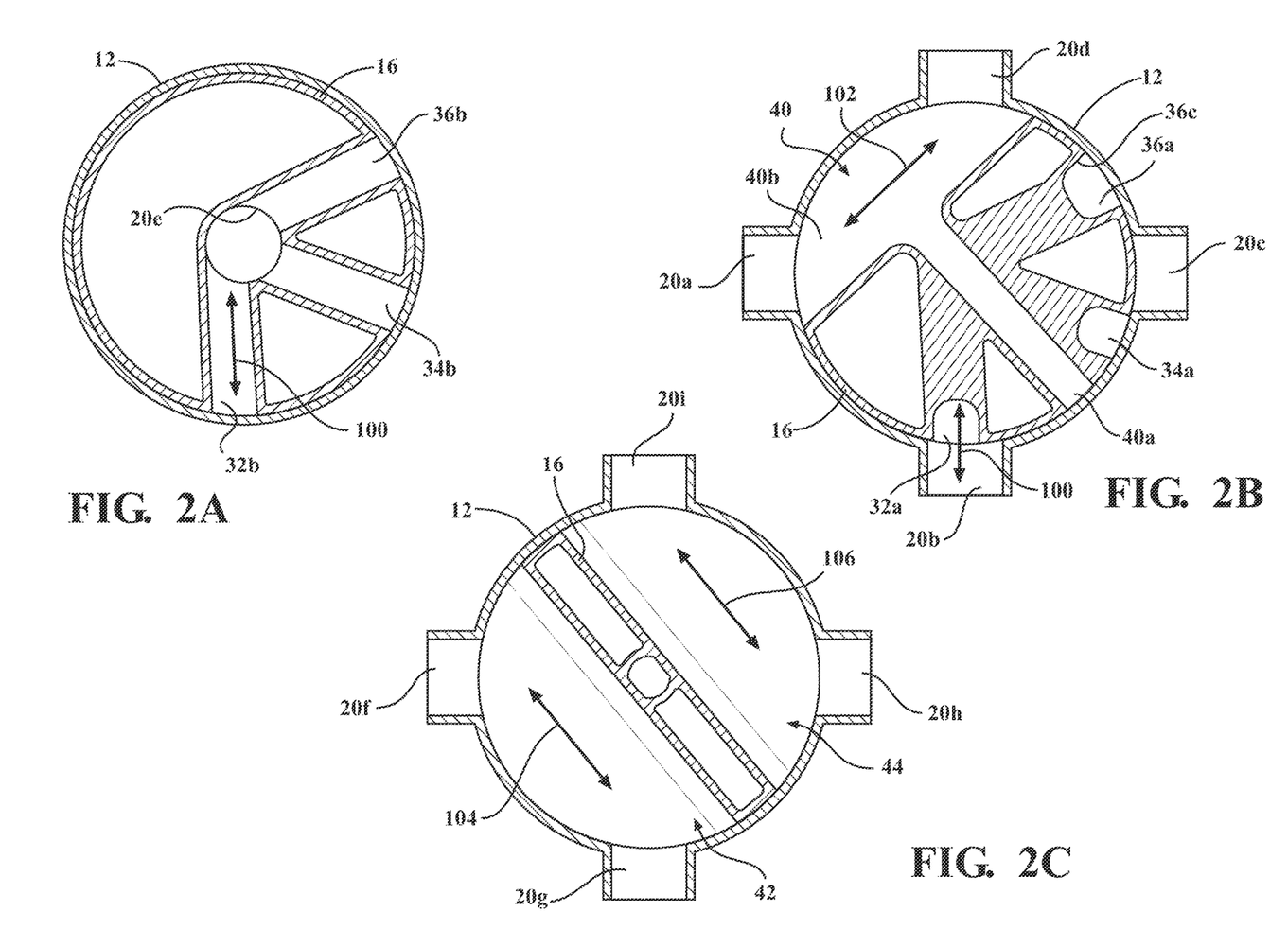
FIG. 2A is a first sectional view of a coolant flow control valve assembly taken along lines 2A-2A in FIG. 1A, with the rotor in a first configuration, according to embodiments of the present invention.
FIG. 2B is a second sectional view of a coolant flow control valve assembly taken along lines 2B-2B in FIG. 1A, with the rotor in a first configuration, according to embodiments of the present invention.
FIG. 2C is a third sectional view of a coolant flow control valve assembly taken along lines 2C-2C in FIG. 1A, with the rotor in a first configuration, according to embodiments of the present invention.

Various configurations of the rotor 16 relative to the housing 12 are shown in FIGS. 2A-6C, which achieve various flow configurations. FIG. 2A is a sectional view taken along lines 2A-2A in FIG. 1A, FIG. 2B is a sectional view taken along lines 2B-2B in FIG. 1A, and FIG. 2C is a sectional view taken along lines 2C-2C in FIG. 1A. FIGS. 3A-6C are similar sectional views, with the rotor 16 in different configurations.

Referring to FIGS. 2A, 2B, and 2C, the rotor 16 is placed in a first configuration, where port 20e is in fluid communication with port 20b through the first side channel 32 to create a first flow path 100, where the first flow path 100 includes flow between the first level 22 and the second level 24 through the first shallow recess portion 32a and the first elongated channel 32b. When the rotor 16 is in the first configuration, the port 20a is in fluid communication with the port 20d through the wide portion 40b of the through channel 40 to create a second flow path 102, the port 20f in fluid communication with the port 20g through the first recess channel 42 to create a third flow path 104, and the port 20h is in fluid communication with the port 20i through the second recess channel 44 to create a fourth flow path 106. There is no fluid that passes through the side channels 34, 36, the elongated through-channel portion 40a, or the port 20c.

Figures 3A, 3B, 3C:
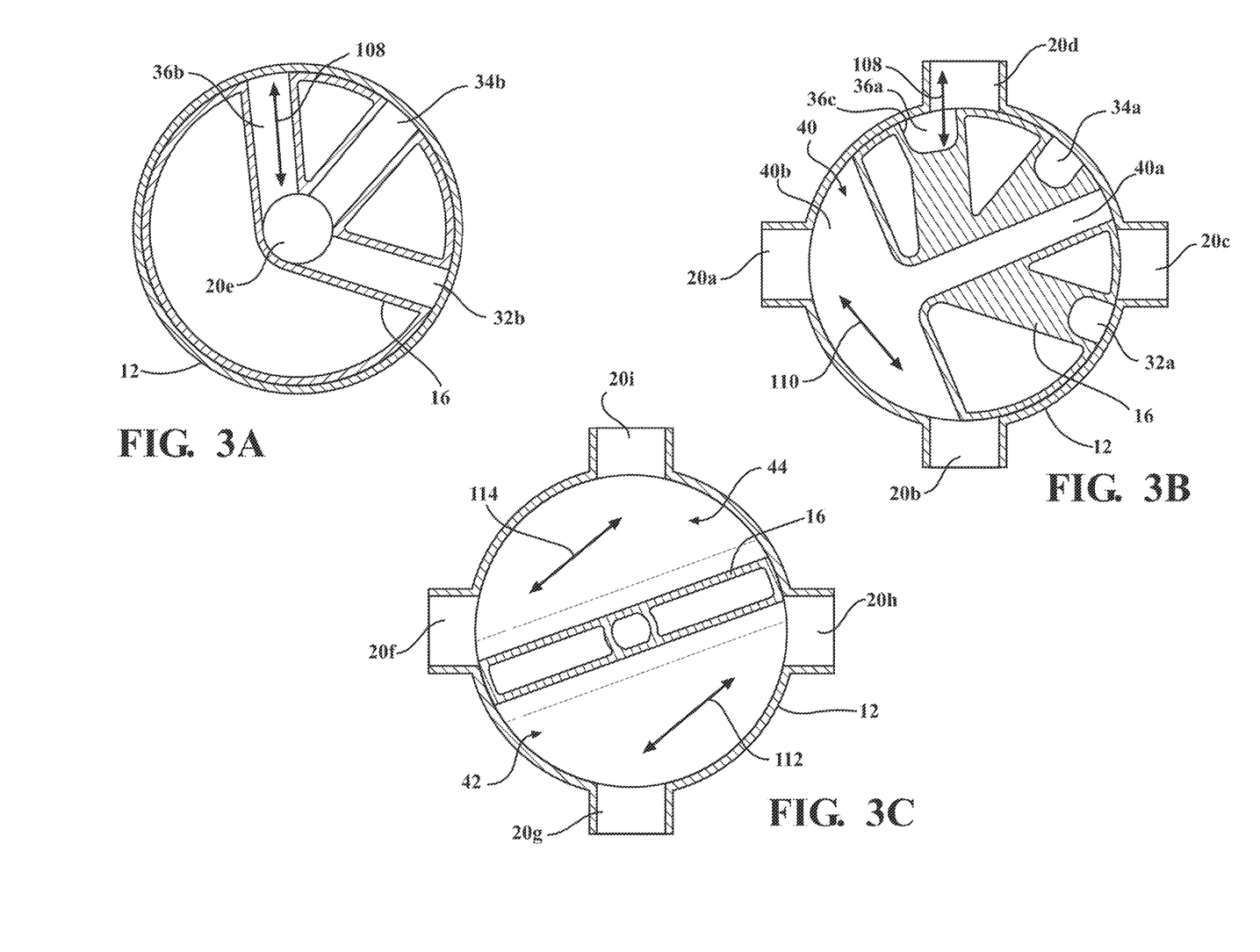
FIG. 3A is a first sectional view of a coolant flow control valve assembly, with the rotor in a second configuration, according to embodiments of the present invention.
FIG. 3B is a second sectional view of a coolant flow control valve assembly, with the rotor in a second configuration, according to embodiments of the present invention.
FIG. 3C is a third sectional view of a coolant flow control valve assembly, with the rotor in a second configuration, according to embodiments of the present invention.

Referring to FIGS. 3A, 3B, and 3C, the rotor 16 is placed in a second configuration, where the port 20d is in fluid communication with the port 20e through the third side channel 36 to form a fifth flow path 108, where the fifth flow path 108 includes flow between the first level 22 and the second level 24 through the third shallow recess portion 36a and the third elongated channel 36b. When the rotor 16 is in the second configuration, the port 20a is in fluid communication with the port 20b through the wide portion 40b of the through channel 40 to create a sixth flow path 110, the port 20g is in fluid communication with the port 20h through the first recess channel 42 to create a seventh flow path 112, and the port 20f is in fluid communication with the port 20i through the second recess channel 44 to create an eighth flow path 114. There is no fluid that passes through the side channels 32, 34 or the port 20c.

Figures 4A, 4B, 4C:
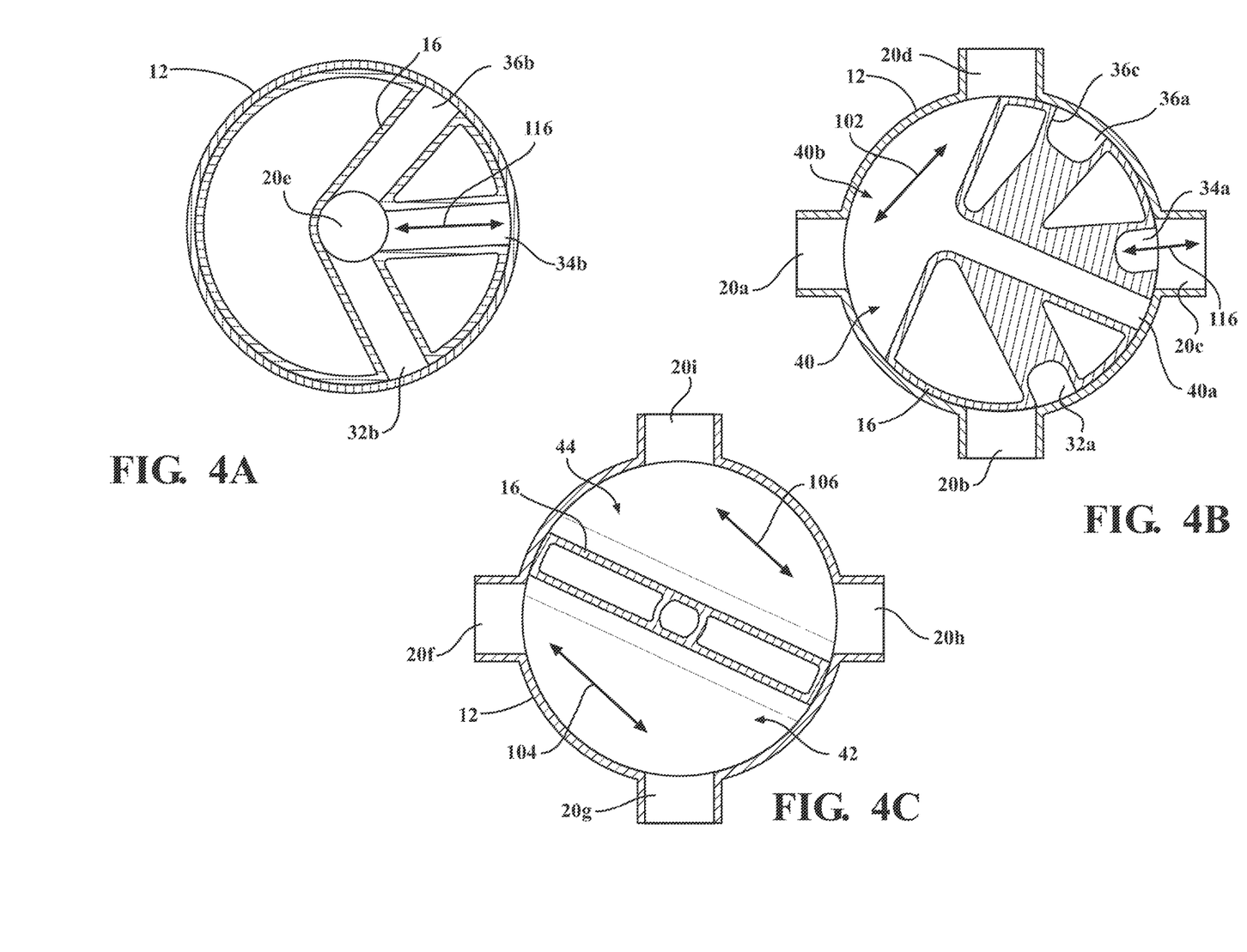
FIG. 4A is a first sectional view of a coolant flow control valve assembly, with the rotor in a third configuration, according to embodiments of the present invention.
FIG. 4B is a second sectional view of a coolant flow control valve assembly, with the rotor in a third configuration, according to embodiments of the present invention.
FIG. 4C is a third sectional view of a coolant flow control valve assembly, with the rotor in a third configuration, according to embodiments of the present invention.

Referring to FIGS. 4A, 4B, and 4C, the rotor 16 is placed in a third configuration, and the third configuration includes, the second flow path 102, the third flow path 104, and the third flow path 106. When the rotor 16 is in the third configuration, the port 20e is in fluid communication with the port 20c through the second side channel 34, creating a ninth flow path 116, where the ninth flow path 116 includes flow between the first level 22 and the second level 24 through the second shallow recess portion 34a and the second elongated channel 34b. There is no fluid that passes through the first side channel 32, the third side channel 36, or the port 20b when the rotor 16 is in the third configuration.

Figures 5A, 5B, 5C:
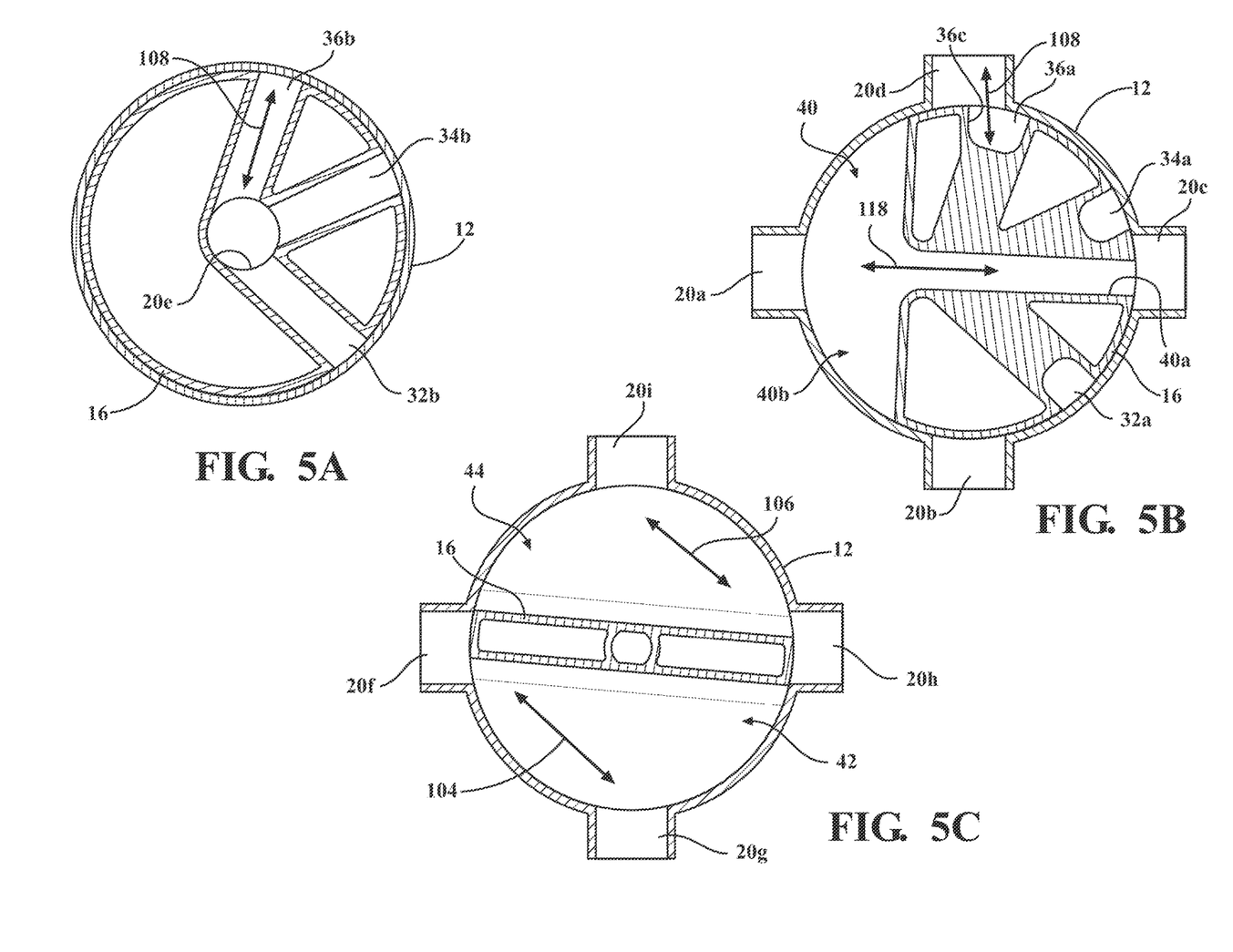
FIG. 5A is a first sectional view of a coolant flow control valve assembly, with the rotor in a fourth configuration, according to embodiments of the present invention.
FIG. 5B is a second sectional view of a coolant flow control valve assembly, with the rotor in a fourth configuration, according to embodiments of the present invention.
FIG. 5C is a third sectional view of a coolant flow control valve assembly, with the rotor in a fourth configuration, according to embodiments of the present invention.

The rotor 16 is in a fourth configuration in FIGS. 5A, 5B, and 5C. The fourth configuration also includes the third flow path 104, the fourth flow path 106, and the fifth flow path 108. However, when the rotor 16 is in the fourth configuration, the port 20a is in fluid communication with the port 20c through the elongated through-channel portion 40a and the wide portion 40b of the through channel 40, creating a tenth flow path 118. There is no fluid that flows through the side channels 32b, 34b or the port 20b.

Figures 6A, 6B, 6C:
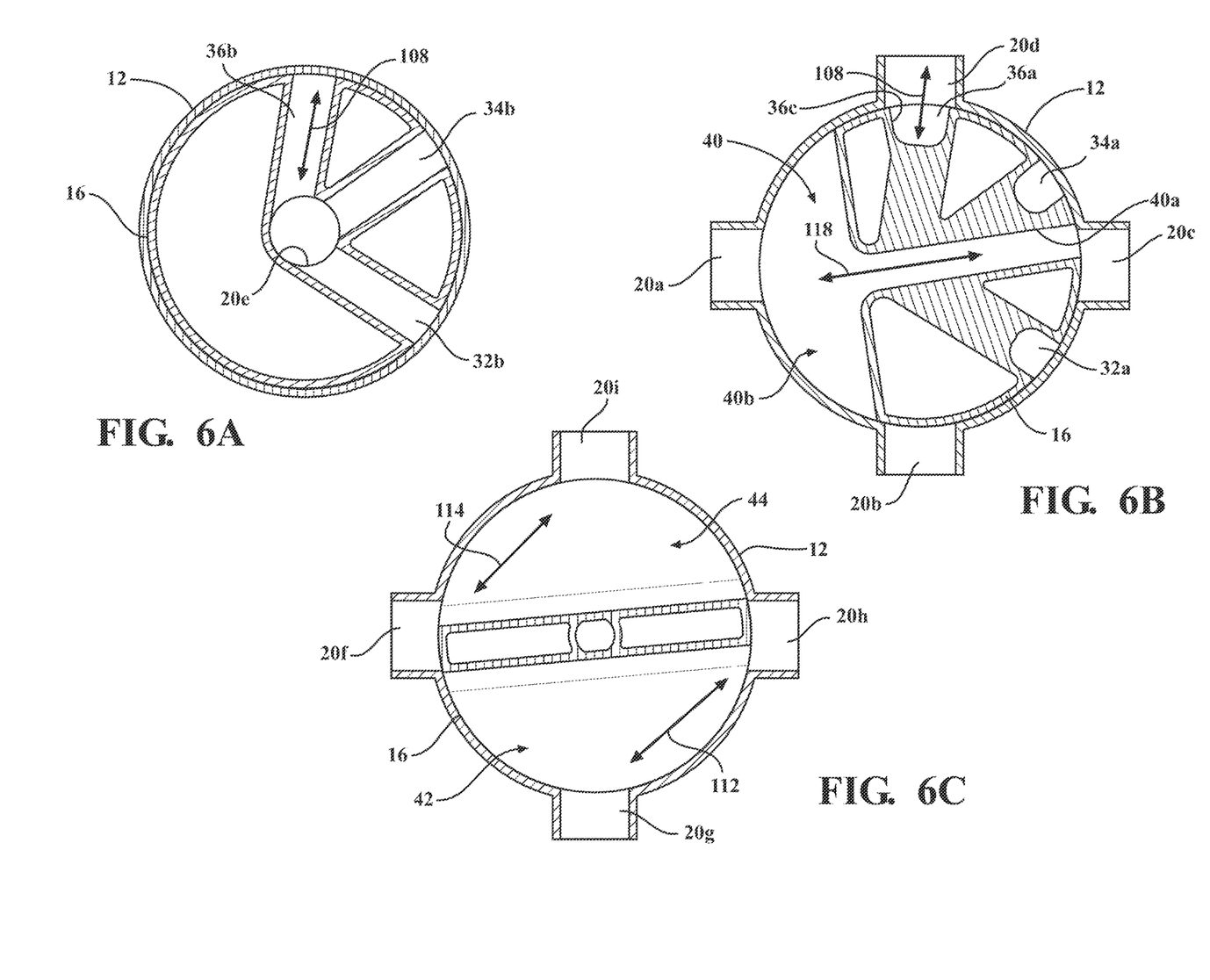
FIG. 6A is a first sectional view of a coolant flow control valve assembly, with the rotor in a fifth configuration, according to embodiments of the present invention.
FIG. 6B is a second sectional view of a coolant flow control valve assembly, with the rotor in a fifth configuration, according to embodiments of the present invention.
FIG. 6C is a third sectional view of a coolant flow control valve assembly, with the rotor in a fifth configuration, according to embodiments of the present invention.

Referring to FIGS. 6A, 6B, and 6C, the rotor 16 is placed in a fifth configuration, and the fifth configuration includes, the fifth flow path 108, the seventh flow path 112, the eighth flow path 114, and the tenth flow path 118.

As mentioned above, bulge portion 36c is part of the third shallow recess portion 36a, such that the third shallow recess portion 36c is wider compared to the first shallow recess portion 32a and the second shallow recess portion 34a. The bulge portion 36c allows for the rotor 16 to be rotated an angular distance, such that the third side channel 36 remains in fluid communication with the port 20d when the rotor 16 is rotated between the second configuration, fourth configuration, and the fifth configuration. This allows for the fifth flow path 108 to be maintained when the rotor 16 is rotated between the second configuration, fourth configuration, and the fifth configuration. The bulge portion 36c provides for similar fluid communication is able to be maintained between the third side channel 36 and the port 20a, between the third side channel 36 and the port 20b, or between the third side channel 36 and the port 20c, as the rotor 16 is rotated to other possible configurations.

It is within the scope of the invention that the rotor 16 in either embodiment may be placed in additional configurations to achieve other flows paths in addition to the ones already described.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
    a rotor for a multi-port valve assembly, the rotor including:
        a plurality of channels;
        a first plane extending through the rotor;
        a second plane extending through the rotor;
        a first level on one side of the first plane, a portion of the plurality of channels integrally formed as a part of the rotor which is located on the first level; and
        a second level on the opposite side of the first plane in relation to the first level, and located between the first plane and the second plane, a portion of the plurality of channels integrally formed as a part of the rotor which is located on the second level;
        a third level located on the opposite side of the second plane in relation to the second level, a portion of the plurality of channels integrally formed as part of the rotor which is located on the third level;
        at least two flow paths;
        a central channel, a portion of the central channel located on the first level, and a portion of the central channel located on the second level;
        at least one side channel in fluid communication with the central channel; and
        at least one recess channel integrally formed as part of the rotor, the at least one recess channel being fluidically isolated from the at least one side channel;
        wherein at least two of the plurality of channels directs the flow of fluid to create the at least two flow paths, and the rotor is rotated relative to the housing such that one of the at least two flow paths includes the at least one recess channel or the at least one side channel.

2. The apparatus of claim 1, the at least one side channel further comprising:
    a shallow recess portion; and
    an elongated channel integrally formed with and in fluid communication with the shallow recess portion;
    wherein the elongated channel is in fluid communication with the central channel.

3. The apparatus of claim 2, wherein the shallow recess portion is located on the second level, and the elongated channel is located on the first level.

4. The apparatus of claim 2, the shallow recess portion further comprising at least one bulge portion, wherein the rotor is rotated an angular distance between two or more of a plurality of configurations, such that the at least one side channel maintains one of the at least two flow paths as the rotor is rotated between two or more of the plurality of configurations.

5. The apparatus of claim 1, the plurality of channels further comprising:
    at least one through-channel integrally formed as part of the rotor, the at least one through-channel further comprising:
        an elongated through-channel portion extending through a portion of the rotor;
        a wide portion in fluid communication with the elongated through-channel portion;
        wherein the elongated through-channel portion and the wide portion are located on the second level;
    wherein the rotor is rotated relative to the housing such that one of the at least two flow paths includes the at least one through-channel or the at least one side channel.

6. The apparatus of claim 5, wherein the at least one through-channel is fluidically isolated from the at least one side channel.

7. The apparatus of claim 1, the at least one recess channel being located in the third level.

8. The apparatus of claim 1, wherein at least one of the at least two flow paths facilitates flow between the first level and the second level.

9. A coolant flow control valve assembly, comprising:
    a housing;
    a plurality of ports, each of the plurality of ports formed as part of the housing;
    a rotor disposed in the housing;
    a plurality of channels integrally formed as part of the rotor, each of the plurality of channels selectively in fluid communication with one or more of the plurality of ports;
    a first plane extending through the rotor;
    a second plane extending through the rotor;
    a first level on one side of the first plane, a portion of the plurality of channels integrally formed as a part of the rotor which is located on the first level;
    a second level on the opposite side of the first plane in relation to the first level, and located between the first plane and the second plane, a portion of the plurality of channels integrally formed as a part of the rotor which is located on the second level;
    a third level located on the opposite side of the second plane in relation to the second level, a portion of the plurality of channels integrally formed as part of the rotor which is located on the third level; and
    a plurality of flow paths formed by the orientation of the rotor relative to the housing and the plurality of ports;

at least one recess channel integrally formed as part of the rotor, the at least one recess channel located on the third level;

at least one through-channel integrally formed as part of the rotor, the at least one through-channel located on the second level;

at least one side channel integrally formed as part of the rotor, the at least one side channel further comprising:
  a shallow recess portion; and
  an elongated channel integrally formed with and in fluid communication with the shallow recess portion;
  wherein the shallow recess portion is located on the second level, and the elongated channel is located on the first level;

a central channel integrally formed as part of the rotor, the central channel in fluid communication with the elongated channel;

wherein the rotor is placed in one of a plurality of configurations to achieve the at least two flow paths, and the rotor is rotated relative to the housing such that one of the at least two flow paths includes one of the at least one recess channel, the at least one through-channel, or the at least one side channel.

10. The coolant flow control valve assembly of claim 9, wherein the at least one recess channel is fluidically isolated from the central channel, the at least one through-channel, and the at least one side channel.

11. The coolant flow control valve assembly of claim 9, wherein the at least one through-channel is fluidically isolated from the at least one side channel.

12. The coolant flow control valve assembly of claim 9, the shallow recess portion further comprising at least one bulge portion, wherein the rotor is rotated an angular distance between two or more of a plurality of configurations, such that the at least one side channel maintains fluid communication with one of the plurality of ports as the rotor is rotated between two or more of the plurality of configurations.

13. The coolant flow control valve assembly of claim 9, wherein the central channel located on the first level.

14. The coolant flow control valve assembly of claim 9, the at least one recess channel further comprising:
  a first recess channel integrally formed as part of the rotor, the first recess channel located on the third level; and
  a second recess channel integrally formed as part of the rotor, the second recess channel located on the third level;
  wherein the rotor is rotated relative to the housing such that one of the at least two flow paths includes one of the first recess channel, the second recess channel, or the at least one side channel.

15. The coolant flow control valve assembly of claim 9, wherein at least one of the at least two flow paths facilitates flow between the first level and the second level.

* * * * *